(No Model.)
W. H. REYNOLDS.
ELECTRIC GOVERNOR.
No. 374,374. Patented Dec. 6, 1887.
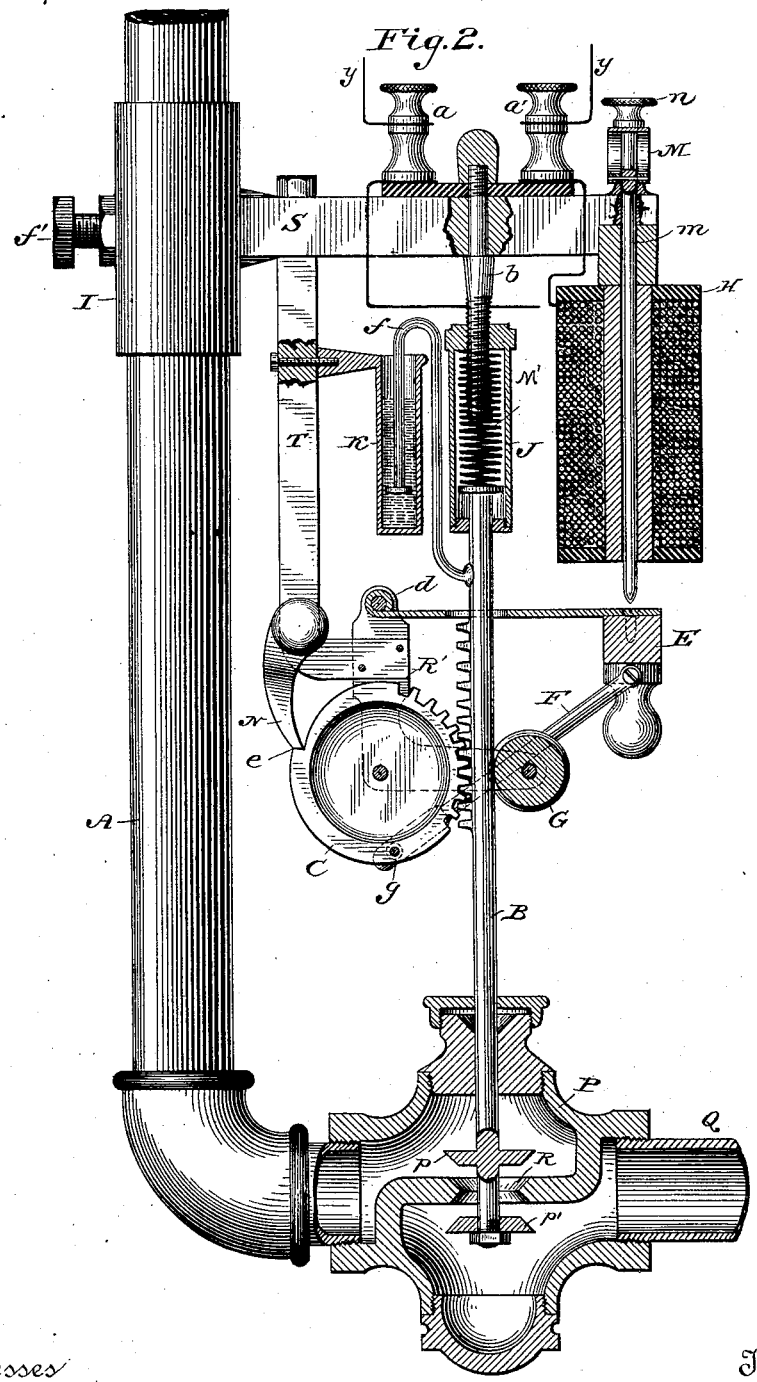
Witnesses
H. W. Elmore
Edw. S. Hutchins
Inventor
WILLIS H REYNOLDS.
By his Attorney
John C. Pennie

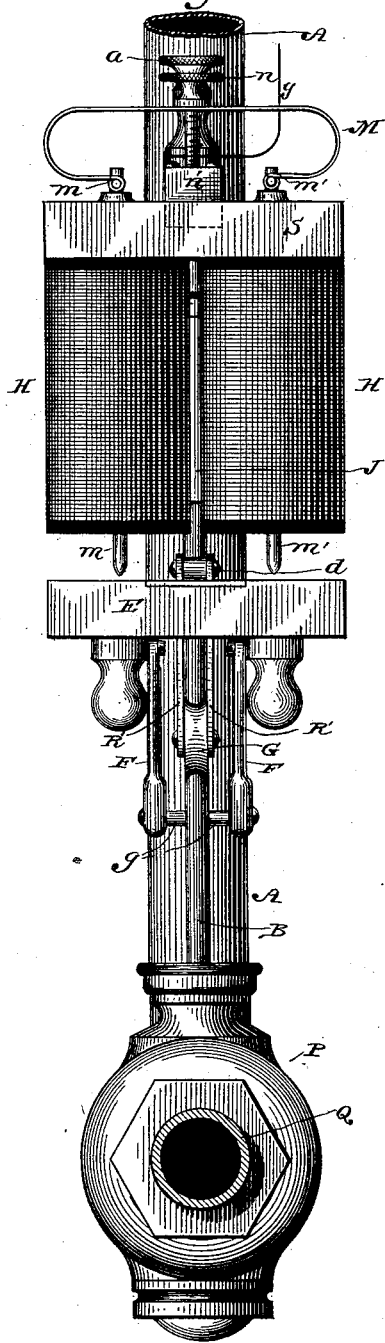

United States Patent Office.

WILLIS H. REYNOLDS, OF WASHINGTON, DISTRICT OF COLUMBIA, ASSIGNOR TO THE COLUMBIA ELECTRIC LIGHT AND MOTOR COMPANY, OF WEST VIRGINIA.

ELECTRIC GOVERNOR.

SPECIFICATION forming part of Letters Patent No. 374,374, dated December 6, 1887.

Application filed March 26, 1887. Serial No. 232,492. (No model.)

*To all whom it may concern:*

Be it known that I, WILLIS H. REYNOLDS, a citizen of the United States, residing at Washington, in the District of Columbia, have invented certain new and useful Improvements in Electric Governors; and I do hereby declare the following to be a full, clear, and exact description of the invention, such as will enable others skilled in the art to which it appertains to make and use the same.

My invention relates to certain new and useful improvements in devices for automatically controlling or interrupting, as the exigencies of the case may require, the energy transmitted from any source of power to a steam-engine or other motor employed for driving a dynamo or other electrical machine, the supply being absolutely regulated by and constantly under the control of the latter.

My invention relates, particularly, to that class of governors wherein, in the event of some accident happening to the dynamo itself, the accident being of such a character as to render any continued revolution of the working parts productive of destructive results, the steam is automatically shut off from the prime motor or engine and the dynamo brought to a complete stop. The principal accidents to which dynamo-machines are liable are, for instance, the displacement of a revolving coil out of its normal path of rotation and the consequent breaking of a wire, or the loosening of a wire at a binding-post, or the like, thereby taking the load suddenly from the engine and causing it to race or run away.

My invention is also adapted to regulate the supply of steam or other motive fluid to the prime motor within the limits of the dynamo's working, so as to automatically effect, for instance, an opening or closing of the throttle-valve from the steam-supply to a degree sufficient to furnish the engine-cylinders the requisite amount of steam to drive the dynamo at a speed sufficient to supply the current demanded from time to time by the varying resistance in the external working-circuit.

A characteristic feature of my invention is the interposition between the armature of the governor-magnet and the actuating-stem for the cut-off of intermediate multiplying gearing, whereby a small movement of the armature will produce a comparatively greater movement of the cut-off, insuring a prompt and delicate regulation of the motive fluid.

In the form of my invention illustrated in the drawings, Figure 1 represents in elevation my invention as applied to the regulation of a motive fluid conveyed by a supply-pipe from its generator to the prime motor. Fig. 2 represents a side elevation of the same, partly in section.

Similar letters of reference indicate similar parts in both views.

Q indicates a conduit from a steam-boiler or other source of power, and A a conduit leading to the steam-engine or other prime motor.

P indicates a throttle-valve housing, provided with the double-conical valve-seat R, and within which plays the valve-stem B, carrying at its lower end the valves $p\ p'$.

The devices for operating the valve are mounted upon a supporting-frame, S, connected with a collar, I, secured by a set-screw, $f'$, or otherwise, upon the conduit A. At the inner end of the frame-work S depends a downwardly-projecting arm, T, to the lower end of which are attached hangers R', between which are journaled a wheel, C, having peripheral cogs engaging with corresponding cogs upon the valve-stem B, and a friction-roller, G, adapted to bear against the opposite side of said valve-stem. The wheel C is provided with a notch, $e$, and a pivoted pawl or stop, N, upon the arm T is adapted to engage with said notch $e$ in starting the engine, as will hereinafter be more particularly set forth. At its upper end the valve-stem B enters a hollow casing, J, containing a coiled spring, M', which bears against the top of the valve-rod and tends to force it downwardly. The casing J is mounted upon a screw-threaded pin, $b$, connected at its upper end to the frame S, whereby a revolution of the casing upon said pin will effect a greater or less degree of compression of the spring M'. A rod, $f$, connected with the valve-rod B, terminates in a dash-pot, K, connected with the arm T, said dash-pot serving to regulate or cushion the rise and fall of the valve-stem.

Upon the frame S are mounted the binding-posts $a$ $a'$, receiving the conductors $x$ $y$ from the dynamo or other electrical machine. From these binding-posts connections are made with the magnets H, mounted upon the outer end of the frame S. An armature, E, is arranged opposite the poles of the magnets, said armature being pivoted at $d$ to the hangers R', and being connected by a link consisting of two rods, F, with the wheel C, as shown at $g$. Through the magnet-cores extend pins $m$ $m'$, of non-magnetic material, said pins being connected at their upper ends with the spring M, and the tension of said spring being regulated by means of the set-screw $n$, which enters the block $n'$.

The parts being arranged as described, the operation of the invention is as follows: In starting up the machine the wheel C is revolved until the pawl N engages with the notch $e$. The revolution of the wheel raises the valve-stem B, thereby holding the throttle-valve in the position indicated in the drawings. When the engine begins to work, the pawl N is removed from engagement with the notch $e$, and the governor is then left under full control of the dynamo-machine current. The engine having generated a current in the dynamo, the magnets H are energized thereby and attract the armature E with a force corresponding to the current traversing them. The armature E is accordingly drawn upward against the pins $m$, thereby compressing the spring M and revolving the wheel C through the intermediacy of the connecting-link F, thereby opening the throttle-valve to a degree corresponding to the strength of the current. In case of increase in the strength of the current, the armature will be attracted more strongly by the magnets, and will compress the spring M and raise the valve-rod B to a corresponding degree, and, conversely, a decrease in the strength of the current will lessen the attraction of the magnets for the armature, permitting the spring M to force it downward, carrying the valve-rod with it. The spring $m'$ within the hollow casing J, which had been compressed with the rising of the valve-stem, assists in its downward movement upon the partial de-energizing of the magnets just described. This rise and fall of the armature E and of the valve-stem B, geared thereto, is controlled wholly from the dynamo itself, and is dependent entirely upon increase and decrease in the dynamo-circuit, the amount of steam or other motive fluid furnished to the actuating-engine being, of course, correspondingly regulated. In case, now, of an actual break in the dynamo-circuit, the magnets H are immediately de-energized, and the compressing-springs M and $m'$ throw the valve-stem downward to its lowermost limit, thereby causing the valve $p$ to rest upon the upper conical face of the valve-seat R and entirely shutting off the motive fluid, thereby instantly stopping the engine and dynamo. On the other hand, should an accident happen to the dynamo itself by the displacement of one of its coils or undue friction between other of the revolving parts, as hereinbefore suggested, the magnets H are immediately powerfully energized, thereby drawing the armature E and valve-stem B upward to their uppermost limit until the valve $p'$ is seated upon the lower conical face of the valve-seat R, cutting off the supply of steam, as before, and bringing the engine to a stop.

The function of the dash-pot K and of the spring $m'$ is to compensate for sudden movements of the valve-stem and to cushion the same in either of the senses in which it moves. The spring $m'$ has the additional function of returning the valve $p$ positively to its seat upon the de-energizing of the magnets H. The function of the spring M, with its rods $m$ $m'$ of non-magnetic material, also acts as a cushion to the armature E, and consequently to the valve-stem geared therewith, while at the same time the armature is prevented from coming in actual contact with the poles of the magnets, and is positively forced away from said poles upon a dropping or cessation of the energizing current, so that any tendency to adherence between the armature and poles is obviated.

It will be noted that the gearing intermediate between the valve-stem and the magnet-armature is such that a small movement of the armature will produce a comparatively larger movement of the valve-stem, thereby rendering the regulation of the cut-off extremely prompt and sensitive.

It is evident that my electric governor may be employed with equally beneficial results in connection with prime motors operated by air, gas, or water power, or electric energy, &c., the regulation of the supply being effected for the production of similar results in all instances.

Having thus described my invention, what I claim, and desire to secure by Letters Patent, is—

1. The combination, with the cut-off for the motive fluid of the prime motor of an electric machine, of an actuating-stem for said cut-off, an electro-magnet in circuit with said machine, and multiplying gearing intermediate between the stem and magnet-armature, substantially as described.

2. The combination, with a supply-pipe for the prime motor of an electric machine, of a valve-stem provided with a throttle-valve, an electro-magnet in circuit with the electric machine, and intermediate multiplying gearing between the valve-stem and magnet-armature, substantially as described.

3. The combination, with a supply-pipe for the prime motor of an electric machine, of a double-seated throttle-valve, a valve-stem therefor, and multiplying gearing intermediate between the valve-stem and magnet-armature, substantially as described.

4. The combination, with an electro-magnet in circuit with a dynamo-machine, of a cut-off interposed in the supply-conduit of the prime motor, and an actuating-stem for said cut-off, provided with cogged teeth, a cog-wheel meshing with said teeth, and a link connecting said cog-wheel with the magnet-armature, substantially as described.

5. The combination, with an electro-magnet in circuit with a dynamo-machine, of a throttle-valve interposed in the supply-conduit of the prime motor and a valve-stem therefor provided with cogged teeth, a cog-wheel meshing with said teeth, a link connecting said cog-wheel with the magnet-armature, and a guide-roller arranged opposite the cog-wheel, substantially as described.

6. The combination, with an electro-magnet in circuit with a dynamo-machine, of a throttle-valve provided with a valve-stem, intermediate multiplying gearing between said valve-stem and the magnet-armature, and a compression-spring acting upon the valve-stem in opposition to the magnet, substantially as described.

7. The combination, with an electro-magnet in circuit with a dynamo-machine, of a throttle-valve provided with a valve-stem, intermediate multiplying gearing between said valve-stem and the magnet-armature, a compression-spring acting upon the valve-stem in opposition to the magnet, and a dash-pot for cushioning the valve-stem, substantially as described.

8. The combination, with an electro-magnet in circuit with a dynamo-machine, of a throttle-valve provided with a valve-stem, intermediate gearing between said valve-stem and the magnet-armature, and a locking device for holding the throttle-valve open in starting up the engine, substantially as described.

9. The combination, with an electro-magnet in circuit with a dynamo-machine and a cut-off geared to the armature of said magnet, of spring-seated projections between the magnet-poles and the armature, normally disconnected with the cut-off, substantially as described.

10. The combination, with an electro-magnet in circuit with a dynamo-machine, of a throttle-valve provided with a valve-stem, intermediate multiplying gearing between said valve-stem and the magnet-armature, a compression-spring acting upon the valve-stem in opposition to the magnet, and means for regulating the degree of compression of said spring, substantially as described.

11. In an electric governor of the kind described, the combination, with a throttle-valve and its cogged stem, of an electro-magnet in circuit with the electric machine, an armature for said electro-magnet, a cog-wheel meshing with the cogged stem, a link connecting the cog-wheel and armature, and a movable catch for the cog-wheel, substantially as described.

12. In an electric governor of the kind described, the combination, with a throttle-valve and its stem, of a magnet in circuit with an electric machine, an armature therefor geared to the said stem, a spring above the magnet, and rods extending through the magnet and connected with said spring, substantially as described.

13. In an electric governor of the kind described, the combination, with the throttle-valve and the stem, of a magnet-armature geared thereto, an electro-magnet in circuit with the dynamo, a compression-spring resting upon the valve-stem, a tension-regulating casing surrounding said spring and resting thereon, and a screw-pin entering the upper portion of the casing, substantially as described.

14. An electric governor consisting of a double-seated throttle-valve, a cogged valve-stem therefor, an electro-magnet in circuit with the electric machine, an armature therefor, a cog-wheel meshing with the cogged valve-stem, a link connecting the cog-wheel and armature, a friction-roller bearing against the valve-stem at a point opposite the cog-wheel, a compression-spring resting upon the valve-stem, and a dash-pot having a plunger connected with the valve-stem, substantially as described.

In testimony whereof I affix my signature in presence of two witnesses.

WILLIS H. REYNOLDS.

Witnesses:
JOHN C. PENNIE,
S. A. TERRY.